Patented Jan. 6, 1953

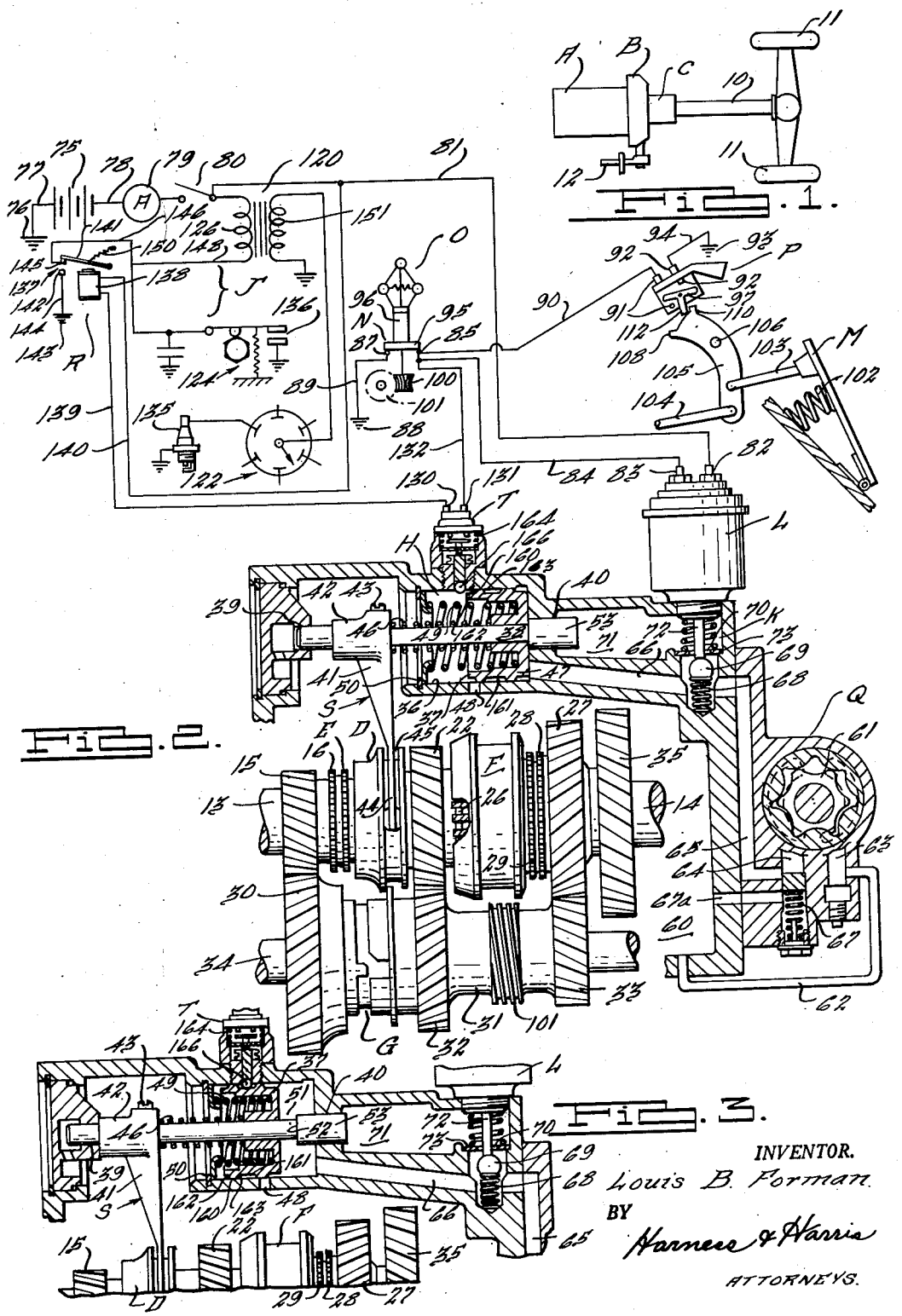

2,624,210

UNITED STATES PATENT OFFICE 2,624,210

TRANSMISSION CONTROL SYSTEM

Louis B. Forman, Detroit, Mich., assignor to Chrysler Corporation, Highland Park, Mich., a corporation of Delaware Application July 24, 1951, Serial No. 238,303

9 Claims. (Cl. 74—472)

This invention relates to motor vehicles and refers more particularly to power transmissions and control systems therefor.

My invention has particular reference to transmission control systems wherein the disengagement of positively engageable drive control elements is facilitated by relieving the torque load on these elements as by momentary interruption of the engine ignition system. Examples of transmissions of this character are described in the patents to Carl A. Neracher et al. 2,455,943 granted December 14, 1948, and Augustin J. Syrovy et al. 2,490,604 granted December 6, 1949.

It has been customary, as shown by the aforesaid patents, to provide a shiftable drive control element of toothed character arranged to interengage with a second toothed drive control element after passing through a toothed blocker. Engagement occurs upon synchronism obtaining between the drive control elements subsequent to engine deceleration by accelerator releasing movement, and the shiftable element is adapted to be unloaded, as described above, to facilitate its disengagement from its companion drive control element.

The drive control elements are generally so arranged in the transmission that upon relative engagement under governor control at or above a predetermined vehicle speed, there is provided a fast speed ratio drive through the transmission, usually a direct drive, and when relatively disengaged under governor control below a predetermined speed, or by kickdown means such as accelerator actuated switch means overruling the governor, there is provided another speed ratio drive which is usually a slower speed ratio drive than the first mentioned one.

Also customarily provided are prime mover or differential pressure servomotor means which may comprise a spring and a hydraulic or vacuum operated motor having a movable piston, for controlling shift of the shiftable drive control element through an associated shift rail or lever system. In the case of the hydraulic system, as typified by the Syrovy et al. patent aforesaid, pressure fluid acting upon the piston will cause it to compress a disengaging spring and an engaging spring, and build up sufficient available force in the latter to move the shift rail and by it the shiftable drive control element against its blocker and then into engagement with its companion drive control element when synchronization of the drive control elements subsequently occurs.

In the case of the vacuum power system, as typified by the Neracher et al. patent, vacuum is utilized to cause the piston to compress a disengaging spring previously tensioned by operation of the rod, the latter spring in turn acting upon a lever to effect movement of the shiftable element against its blocker and into subsequent engagement with its companion drive control element when the drive control elements obtain synchronism.

Transmission systems of the aforesaid typical character also usually include electromagnetically controlled valving for controlling venting (admission of atmospheric pressure) of the servo motor and operation of the piston such that when the motor is vented, the disengaging spring actuates the piston to effect disengaging shift of the shiftable drive control element accompanied by ignition interruption, the latter occurring as an incident to available lost motion operation of the piston relative to the shift rail in Syrovy et al., and the piston rod relative to the lever operating member in Neracher et al.

Customarily there is also provided an ignition interrupter switch operated by movement of the piston in Syrovy et al. or by the piston rod in Neracher et al. Moreover, as in the above patents, there is provided an electrical system intended to accommodate interruption of the engine ignition only during the disengaging stroke of the piston, it being so arranged that even though the ignition interruption switch closes on the return (engaging) stroke, the ignition is not ordinarily grounded out because at such time neither of the parallel arranged kickdown and governor switches which are arranged in series with the ignition interrupter switch and in series with the valve solenoid in a parallel circuiting is closed. Hence firing of the engine is not usually interrupted during acceleration from vehicle standstill in the slower speed ratio drive.

Although the foregoing described arrangements have in general been satisfactory, they have been open to one or more unforeseen conditions of operation which it is desirable to avoid.

In the arrangement disclosed by Neracher et al. and Syrovy et al., especially where a higher resistor type of ignition harness has been employed, some lurching of the vehicle has been noticeable in vehicle operation during upshifts. It is believed that in a circuiting wherein actuation of the interrupter switch places the ignition primary coil and the solenoid of the control valve in parallel circuits, the solenoid coil acts as a parallel impedance of low value to the primary coil of the ignition and causes the spark delivered by the secondary at the plugs at the time of current flow thereto to be weakened. In this connection, it may be observed that under normal engine operation the higher the engine R. P. M., the lower is the secondary voltage, and since the upshift takes place at a substantial R. P. M. the effect of the low impedance is to weaken the spark sufficiently so that it may be unable to keep the engine running momentarily, as by causing the engine to misfire. This condition can occur, for example, in the Neracher et al. arrangement and in the Syrovy et al. system when the relay coil of the latter has a low impedance effect on the ignition primary.

An object of my invention is to provide an improved ignition interruption control adapted for use, for example, with a transmission control system of the types disclosed in the aforesaid patents and which is capable of operation without weakening the ignition during the return, i. e., upshift stroke of the piston.

Another object of the invention is to provide a transmission shift control system having means for interrupting the engine ignition when effecting a downshift, but which system inhibits weakening of the ignition spark intensity during the upshifting operations.

Still another object is to provide a transmission shift control system having means for momentarily interrupting the engine ignition when effecting disengagement of a pair of interengaged drive control elements, and which system also provides means for preventing weakening of the ignition spark intensity when effecting engagement of said elements.

A specific object is to provide a transmission shift control system of the above described character wherein the valve operating solenoid is prevented from acting as a parallel impedance to the primary winding of the ignition coil if the interrupter switch is operated during upshifting.

Other objects and features of my invention will be apparent from the following description wherein:

Figure 1 is a diagrammatic plan view of the driving power plant for the vehicle;

Figure 2 is an elevational view partly in section of my invention as applied to a semi-automatic four speed forward and reverse transmission, a part of the control system being schematically illustrated, the manually operable clutch sleeve being shown in its forward or high range position for starting the vehicle from rest, and the power shiftable mechanism and power operable clutch sleeve being shown in the released position of the latter; and Figure 3 is an elevational view similar to a portion of that in Figure 2 and showing the power shiftable clutch sleeve in its direct drive or engaged position and the power shifting mechanism in the corresponding position.

In the drawings in which similar numerals indicate similar parts of the structure, Figure 1 illustrates a typical motor vehicle power plant having a conventional engine A for transmitting power through a propeller shaft 10 to drive the rear ground wheels 11. In the housing B there may be provided a fluid power transmitting device, such as a fluid coupling arranged in tandem with a master friction clutch of known type, the latter being releasable to uncouple the engine from the transmission by operation of a conventional clutch pedal 12. Rearwardly of the housing B is a transmission C which may be any type incorporating positively engageable drive control elements of a character usually subject to substantial thrust or torque load in operation, the latter conditions making the use of some form of unloading means desirable to insure release of the drive control elements when a speed change requiring disengagement of these elements is necessary.

The transmission C may be of various known types. For purposes of illustration I have shown in Figure 2, a commercial form of four-speed and reverse countershaft underdrive transmission. This transmission comprises an input or driving shaft 13 which receives drive from the engine A by way of the clutch assembly B, and an output or driven shaft 14 which is adapted to transmit drive to the propeller shaft 10. The driving shaft 13 carries the main driving gear or pinion 15 and a set of positive jaw clutch teeth 16 which are adapted to be engaged by the teeth of a jaw clutch sleeve D. As will be hereinafter seen, the sleeve D together with the clutch teeth 16 comprise relatively movable drive control elements for effecting stepup and stepdown manipulation of the transmission.

The clutch sleeve D is slidably splined on teeth, not shown, of a forward hub portion of the high or third speed gear 22 which is rotatably journalled on the driven shaft 14 and adapted to be clutched thereto through a jaw clutch sleeve F slidably splined on a hub, not shown, drivingly carried by the shaft 14 and interengageable with jaw clutch teeth 26 carried by the gear 22. The forward shift of sleeve D for clutching with teeth 16 is normally controlled or impeded by a toothed blocker E whereby clutching is limited to synchronous relationship in the speeds of rotation of gears 15 and 22 and, in the particular construction illustrated, limited to engine coast conditions obtainable by accelerator releasing movement to secure deceleration of the engine. The blocker E is journalled on a conical surface, not shown, carried by the shaft 13 against which it is frictionally urged by a spring, also not shown, and has a limited lost motion connection with the sleeve D or gear 22 whereby it may rotate to place its teeth in blocking relation to the teeth of sleeve D whenever the gear 15 rotatably leads or lags the sleeve D. When sleeve D moves past the blocker E into engagement with the clutch teeth 16, the gears 15 and 22 are placed in a two-way direct drive relationship.

Gear 22, as stated above, is loosely journalled on the driven shaft 14 whereas the pinion 15 is part of the input shaft 13. Also loosely journalled on the output shaft 14 is a low or first speed gear 27 having jaw clutch teeth 28 engageable by the sleeve F. Associated with the sleeve F on each side thereof is any commercial type of blocker synchronizers 29 such that clutch F may be shifted from a neutral position disengaged from teeth 26 and 28 forwardly to a high range position to synchronously clutch shaft 14 with the high speed gear 22 through the teeth 26 or rearwardly to a low range position to synchronously clutch shaft 14 with the low speed gear 27 at its teeth 28. Manual shifts of the sleeve F are facilitated by release of the main clutch at B by means of the clutch pedal 12.

Gear 22 is also adapted to be driven from gear 15 at a speed different from 1:1 and to this end I have shown a countershaft type one-way reduction driving means between these gears. This drive comprises the coaxially rotatable countershaft gear 30 and cluster gear 31 wheels 32, 33 respectively, in constant mesh with gears 15, 22, and 27 and an overrunning roller clutch G operably interposed therein between the gear 30 and cluster 31. A stationarily mounted countershaft 34 provides a journal support for the countershaft gears. Assuming the usual clockwise rotation of shaft 13 as viewed when looking from front to rear of Figure 2, then overrunning clutch G will automatically clutch gear 30 and cluster 31 together when gear 30 is driven counterclockwise at a speed tending to exceed that of the cluster 31 and automatically release the drive between these gears to allow gear 30 to slow down below the speed of cluster 31. For obtaining reverse drive an idler gear (not shown) having constant mesh with the gear 33 is shiftable rearwardly into mesh with a gear 35 fixed on shaft 14, the clutch F being then in its neutral position disengaged from teeth 26 and 28.

As thus far described, it will be apparent that with the parts arranged as in Figure 2, sleeve F being then in high range position engaged with teeth 26, drive of shaft 13 will cause the output shaft 14 to be driven at a reduction drive (third speed) through the gears 15, 30 overrunning clutch G, gears 32, 22 and sleeve F. Should the sleeve D be biased forwardly during this reduction drive, blocker E will obstruct sleeve D in an intermediate position of its shift preventing ratcheting of its teeth with the teeth 16. However, if the driver releases the engine throttle control in the form of the usual accelerator pedal then, as will be apparent, overrunning clutch G will allow gear 15 and teeth 16 to slow down relative to the sustained speed of gear 22 and when the speed of gear 15 reaches synchronism with that of gear 22, blocker E will move to an unblocking position and allow sleeve D to move further forwardly to clutch its teeth with teeth 16 to the position shown in Figure 3, to provide the direct drive (fourth speed); clutch G continuing its overrunning operation. Upon return of sleeve D to disengaged position shown in Figure 2, followed by speeding up the engine, overrunning clutch G will automatically engage to restore the reduction drive.

When clutch sleeve F is shifted rearwardly to low range position to clutch gear 27 to shaft 14 an overrunning slow speed drive (first speed) is transmitted from the shaft 13 to the shaft 14 by way of the gears 15, 30, overrunning clutch G, gears 33 and 27 and sleeve F. At such time as the sleeve D is biased forwardly and the shaft 13 is allowed to slow down to permit the teeth 16 to become synchronized with the sleeve D, the sleeve will move past the blocker E and clutch with the teeth 16 to establish a two-way relatively fast speed drive (second speed) in the low range, which drive will be from the shaft 13 through the sleeve D, gears 22 and 32, gears 33 and 27, and clutch F to the shaft 14, the clutch G overrunning by reason of the cluster 31 rotating at a higher speed forwardly than the gear 30.

It will be understood the driver may start the vehicle from rest in the low range drive and subsequently shift to the high range incident to momentary release of the master clutch and this either prior to or subsequent to engagement of the clutch D. Most drivers, however, usually start the vehicle from rest in the slow speed ratio of the high range and at a subsequent higher speed obtain the automatic upshift to direct drive by momentary release of the accelerator pedal described above.

A more complete description of the transmission specifically illustrated in this application and its method of operation is set forth in the patent to A. J. Syrovy et al. 2,490,604 aforesaid.

A speed responsive governor means O is provided to control forward bias of the sleeve D as well as rearward bias thereof as will be presently more apparent. Moreover, during drive in either second or fourth speeds referred to above, a downshift to first or third speeds respectively may be effected by way of overruling the governor O through driver depression of the accelerator pedal M to substantially wide open throttle position, which operation is referred to in greater detail below.

As seen in Figure 2, I have illustrated a servo motor H by which to obtain power actuation of the clutch sleeve D, the motor here illustrated being of the pressure differential and spring operated type and in the disclosed embodiment functioning by means of fluid pressure. This motor preferably comprises a cylinder 36 slidably receiving a piston 37. The piston slidably receives a shift rail or rod 38 mounted to operate in the guideways 39 and 40. Fixed to rod 38 is a yoke 41, a hub portion 42 of which is secured to the rod 38 by means of a dowel screw 43. The rod 38 and yoke 41 constitute motion transmitting means S for the sleeve D, the yoke 41 as seen in Figure 2, having fingers 44 engaging in a groove 45 of the sleeve D to effect shift thereof.

A relatively small preloaded engaging spring 46 surrounds the rod 38 and is disposed between the hub of piston 37 and the hub 42 of the yoke 41. This spring 46 provides a lost motion thrust transmitting connection between the piston 37 and the hub 42 of the motion transmitting means S such that the piston 37 may be moved forwardly (to the left in Figure 2) for its power stroke, the piston 37 continuing its forward motion by fluid pressure even after the clutch D has been moved against the blocker E until the lip 47 of the piston uncovers the relief port 48 of the cylinder 36 whereupon forward movement of the piston 37 will cease, the fluid pressure being then expended through the relief port 48.

During the said forward movement of the piston 37 the engaging spring 46 is compressed and urges the rail 38 through the hub 42 of the yoke 41 forwardly thus in turn shifting the clutch sleeve D to its intermediate position blocked by the blocker E. Subsequently upon synchronous rotation of the teeth 16 and sleeve D being obtained in response to accelerator releasing movement, the sleeve D is moved through the blocker E into engagement with the teeth 16 of the drive pinion 15, which is its fully engaged upshifted position shown in Figure 3, establishing the previously described direct drive between the shaft 13 and gear 22.

A relatively large preloaded downshift or kickdown spring 49 is disposed between an abutment ring 50, located at the forward end of the cylinder 36, and the piston 37. This spring serves to return the piston 37 and sleeve D from their Figure 3 positions to their downshifted or disengaged position shown in Figure 2. It will be observed from Figure 3 that the piston 37 when in its furthest forward position shown in this figure uncovering the port 48 has moved further than the shift rail 38 such that a gap 51 is created between the piston 37 and a shoulder 52 of the portion 53 of the shift rail. This gap 51 facilitates a lost motion movement of the piston 37 relative to the shift rail 38 prior to disengaging movement of the sleeve D which can only commence following abutment of the piston 37 with the shoulder 52. As previously noted, forward movement of the piston 37 is stopped upon uncovering the port 48, the latter permitting any excess pressure required to hold the piston 37 in its furthest position to be relieved and preventing the building up of such excess pressure in the cylinder.

The pressure fluid supply system is shown in Figure 2 and comprises a suitable supply source 60, which is usually the transmission sump. A pump Q of the rotary gear type is mounted on the shaft 14 and has its rotor 61 driven by that shaft, oil being drawn from the supply source 60 through the conduit 62 to the pump inlet 63 and is delivered under pressure at the pump outlet 64 to the conduit 65 and then to the passage 66 under control of a ball valve K. A relief valve, generally designated by the numeral 67 and provided at the pressure side of the pump between the outlet 64 and the ball valve K serves as a relief valve in the event the valve K is not open in normal operation of the transmission to thereby permit pressure fluid trapped behind the piston 37 to be dumped back into the transmission sump 60 through the conduit 67a.

When the valve K is closed, oil under pressure is forced directly from the pump through the passage 66 to the cylinder 36 where it moves the piston 37 forwardly to effect forward movement of the shift rail 38 in the manner described above whereby the shift sleeve D is operated from its disengaged position in Figure 2 to its engaged position of Figure 3 to establish second or fourth speed ratio drive depending upon whether the clutch F is engaged with the first speed gear 27 or with the third speed gear 22.

Valve K is closed by bias of a valve spring 68 acting against a ball 69 to close a discharge port 70 opening into a passage 71 draining to the sump or supply source 60. The valve K is actuated to its open position under control of an electromagnetic device comprising a solenoid L having a plunger 72 connected with the movable core of the solenoid. The valve K is closed when the solenoid L is deenergized. The spring 68 then actuates the ball 69 against a seat 73 to close the port 70 and effects movement of the solenoid plunger 72 to its retracted position. The valve K is open when the solenoid L is energized, the solenoid core then moving the plunger 72 downwardly to push the ball 69 off the seat 73 of port 70. The oil may now flow from the pump Q through the conduit 65, port 70, passage 71, back to the sump 60.

When the valve K is open, it is impossible for sufficient fluid pressure to develop in the passage 66 to move the piston 37 against the force exerted by the piston return spring 49 which then maintains the piston at the extreme rearward position of its capable movement. Hence the piston 37 is actuated by fluid pressure only to establish second and fourth speeds respectively at which time the valve K is closed and the solenoid L deenergized. Figure 2 shows the valve K in its open position and the piston 37 in its position retracted by spring 49, and Figure 3 shows the valve K in its closed position and the piston 37 in its furthest forward position under control of the pressure fluid.

Energization and deenergization of the solenoid L is brought about by operation from one position to another of either of two control members, one actuated in response to vehicle speed, and the other in response to manipulation by a driver control member. One of these control members is the governor O, and the other is a kickdown switch generally designated by the letter P. Suitable electrical circuit means are provided for effectuating the control operation of the governor and kickdown switch over the solenoid L. Thus a suitable source of electrical energy, for example, a storage battery 75 has one side grounded as at 76 by a conductor 77 and its other side connected by a conductor 78 through an ammeter 79 to the ignition switch 80. A conductor 81 connects the ignition switch with one terminal 82 of the solenoid L, the other terminal 83 of the solenoid being connected by a conductor 84 with a terminal 85 of a switch generally designated by the letter N which is operated by the governor O and which has a second terminal 87 connected to a ground 88 by a conductor 89. From the governor switch terminal 85 a conductor 90 extends to a terminal 91 of the kickdown snap switch P, this switch having a second terminal 92 connected to a ground 93 by a conductor 94.

The governor switch N is closed by a movable conductor switch bar 95 operated by an insulated sliding sleeve 96 of the governor O, the switch being closed when the bar 95 bridges the terminals 85 and 87. The kickdown switch P is of the snap type and has a conductor bar 97 which closes the same by bridging the terminals 91 and 92 of this switch.

Thus by means of the governor switch N and the kickdown switch P, two parallel ground circuits are provided for the solenoid L, the governor switch N opening at a speed proportional to vehicle speed established by the drive connection 100, 101 between the governor O and the countershaft cluster 31. It will be understood that the governor driving means 101 may if desired be on the driven shaft 14.

The kickdown switch P, as shown in Figure 2, is in open position under control of a coil spring 102 and which biases the accelerator M to its released position.

The accelerator M is suitably connected with the usual engine carburetor throttle valve by means including linkage 103, 104 which serves to open and close the throttle valve. Interposed in the throttle valve operating linkage is a lever 105 pivotally supported at 106 and having spaced fingers or projections 108, 110 for operating the actuating finger 112 of the snap switch P. The mechanism is preferably arranged such that in operation, the switch finger 112 is engaged by the lever projection 108 as the throttle valve in response to depression of the accelerator M approaches its full open throttle position, so that the switch P is closed with snap action during approximately the last 5° or so of throttle opening movement. It will be understood that the operation of this switch may be adjusted to occur subsequent to full open throttle position by the provision of suitable lost motion mechanism such as disclosed in the patent to Neracher et al. 2,455,943. When the accelerator M is released, the finger 110 comes into contact with the actuating finger 112 of the switch near the fully released position of the accelerator to actuate the switch P to its open position, again by snap action, the parts being so arranged that the switch P will be opened by finger 110 whenever the accelerator pedal is fully released.

The ignition mechanism generally designated by the letter J is of conventional type and includes an ignition coil 120, a distributor 122, and a breaker 124. Grounding of the ignition for torque relief is obtained under control of a normally open ignition interrupting control switch T having terminals 130, 131, the latter of which connects by a conductor 132 with the terminal 85 of the governor switch N providing a ground 88 for this relay, the terminal 85 being a common terminal for conductor 90, and 84, the former extending to the kickdown switch P providing a ground 94 and the latter to the valve solenoid L.

As noted above, prior control structures providing the valve solenoid and ignition primary winding in parallel arranged circuits made it possible for the solenoid to function as a parallel impedance of low value to the primary winding and weaken the spark delivered by the secondary at the spark plug 135 when current flow thereto took place.

A feature of the present invention is to overcome this difficulty and to accomplish this I provide between the coil 120 and circuit breaker 124 of the ignition mechanism J and the ignition interrupting control switch T, a control relay R which I may for convenience, term an impedance control relay so arranged that its own winding will not function as did the valve solenoid L previously. This relay will preferably function to permit ignition interruption during a normal governor or accelerator controlled downshift but not during normal upshifts by governor or accelerator control and further will prevent a circuit being established between the solenoid L and the circuit breaker points 136 (sometimes called the distributor points), during upshifting when the interrupter switch is manipulated to close momentarily, thereby preventing the solenoid L from producing the undesirable impedance effect above noted.

The relay R comprises a normally open ignition interrupting switch 137 and solenoid 138. The latter is connected by a conductor 139 with terminal 130 of the ignition interrupting control switch T and by a conductor 140 with conductor 81 of the battery side of the circuiting. It will be observed that the solenoid 138 will be energized to effect movement of the switch arm 141 to close ignition interrupting switch 137 whenever the governor switch N or the kickdown switch P is closed. The ignition interrupting switch 137 has a terminal 142 connecting with a ground 143 by a conductor 144 and has a switch terminal 145 that connects by a conductor 146 with a conductor 148 connecting the primary winding 126 and the circuit breaker 124.

Whenever the solenoid 138 is energized by closing of ignition interrupting control switch T at a time when either the governor switch N or kickdown switch P is also closed, the ignition interrupting switch 137 will be actuated to closed position to apply the ground 143 to the primary winding 126 and thereby ground the ignition. When the solenoid 138 is again deenergized, the ignition interrupting switch 137 will be opened by opening 150 to reestablish the ignition.

When the ignition interrupting control switch T is momentarily closed during upshift, the solenoid 138 will not be energized since at this time neither of switches N nor P are closed. Moreover, at this time it is impossible for parallel closed circuits to be established from battery to the breaker points 136 through the primary winding and through the solenoid L or the solenoid 138. Hence there will be no loss of current flow from the secondary winding 151 to the spark plugs 135.

It will be noted that the piston 37 has its outer skirt 160 reduced at 161 adjacent the cammed portions 162, 163 for controlling operation of the ignition interrupting control switch T. This switch is biased to open position by a spring 164 and has its operating stem engaging a ball 166 so arranged in association with the piston portion 160 that switch T is open when the piston is in the Figure 2 position and in the Figure 3 position of forward movement of the piston. However, as the cammed portions 162, 163 move by the ball 166 in either direction of movement of the piston, the ball 166 is actuated to close the switch T. Thus, for example, in the forward movement of the piston the cammed portion 162 operates the ball to close the switch and the cammed portion 163 permits the ball to return the switch to open position the ball 166 dropping in the reduced portion 161 of the piston, as seen in Figure 3. On the downshifting movement of the piston from that shown in Figure 3, the cammed portion 163 actuates the ball 166 to close the switch T and the cammed portion 162 permits the ball to return to the open position of the switch T.

The operation of the transmission and control system will now be described. Let it be assumed that the vehicle is at a standstill with the manual sleeve F shifted forwardly in engagement with the teeth 26 of the third speed gear 22 as seen in Figure 2. At this time the governor switch N will be closed and provides a circuit from the battery 75 to the ground 88 by way of the conductors 78, 81 and the solenoid L, thus energizing the latter whereby the solenoid rod 72 maintains the ball 69 of the valve K in its down position venting the motor H so that the spring 49 holds the piston 37 and the clutch sleeve D in the position shown in this figure. The ignition interrupting control switch T is open as shown, the ball operator 166 thereof being free of the skirt 160 of the piston 37. The switch 137 of the relay R is open since the solenoid 138 is deenergized, the ignition interrupting control switch T being then open. The kickdown switch P is open since the accelerator pedal is released.

By depressing the accelerator pedal within its normal operating range, the vehicle is driven in third speed ratio drive. At some predetermined speed of vehicle travel, for example 12 to 14 M. P. H. (6 to 7 M. P. H. in first speed), the governor O actuates the switch N to open position thus breaking the circuit between the ground 88 and the conductor 84. The solenoid L is thereupon deenergized and the valve K closed by operation of the spring 68 which moves the ball 69 of the valve to close the port 70 at the entrance of the return passage 71, thus permitting pressure to be built up by the pump Q in the passage 66. At the moment of operation of the solenoid L the ignition interrupting control switch T is in open position and the relay switch 137 in open position as shown in Figure 2. When the fluid pressure in the passage 66 builds up sufficiently, the piston 37 moves forwardly for its upshift stroke and comes to rest at the position shown in Figure 3 where the relief port 48 is uncovered by the piston to relieve fluid pressure in excess of that required to maintain the piston at this position.

During forward movement of the piston 37, the springs 46 and 49 are compressed. Initially the spring 46 moves the motion transmitting means S and thereby the sleeve D to its blocked position against the blocker E. Then lost motion movement takes place between the piston 37 and the shift rail 38 during which the springs 46 and 49 continue to compress. During the lost motion movement, the skirt 160 of the piston has its cammed portion 162 move past the ball 166 of the switch T camming the ball 166 upwardly to close this switch, the switch T remaining closed until the cammed portion 163 of the skirt 160 passes under the ball 166 at which time the ball drops into the recess or relief portion 161 of the piston to reestablish the switch T in open position. Thereafter, upon accelerator release to synchronize the speeds of the sleeve D and the clutch teeth 16, the sleeve D is moved by the spring 46 acting upon the yoke 41 of the motion transmitting means S, to its engaged position shown in Figure 3. During this engaging movement, the rail 38 moves forwardly relative to the piston 37, the latter remaining in its position shown in Figure 3, uncovering the port 48.

Although the ignition interrupting control switch T is operated during the forward movement of the piston 37, the spark delivered by the secondary winding 151 of the ignition system at the plugs 135 is neither interrupted nor weakened for the reason that the governor switch N and the kickdown switch P are open and therefore the solenoid 138 of the relay R is deenergized and the switch 137 thereof is open. Thus the ground 143 is not available for interrupting the ignition system, nor is it possible for the solenoid L and the primary winding 126 to be simultaneously subjected to current flow in parallel circuits from the battery having as a common ground terminus the breaker points 136. Neither is it possible for the solenoid 138 itself and the primary winding 126 to be conditioned for current flow in parallel series having as a common ground the breaker points 136.

Once established in fourth speed, a downshift to third speed is effected either by kickdown switch P by means of the accelerator pedal M or by the automatic closing of the governor switch N when the speed of the vehicle drops below the upshift speed set for the transmission. For example, when the driver desires to manually effect the downshift from fourth speed to third speed, he fully depresses the accelerator pedal M. During this operation, for example, as the throttle approaches its full open position, the switch P is closed. Since the engine is then delivering its full power, it is desirable to effect torque relief at the teeth 16 to facilitate the release of sleeve D for the downshift. At this time the switch T is in its Figure 3 open position with the ball 166 in the recess 161 of the piston which is then in its position adjacent the relief port 48. Moreover, the motion transmitting means S is in the fully engaged position of the sleeve D as shown in Figure 3, and the relay switch 137 is in its open position. Closing of the switch P applies the ground 93 to the solenoid L circuit from the battery 75 causing energization of the solenoid L and opening of the valve K to vent the motor H. Opening of the port 70 of the valve K by the solenoid L permits the pressure in the passage 66 to drop rapidly allowing the piston 37 to commence its rearward movement under bias of the spring 49.

As noted above, the ignition interrupting control switch T is in series with the solenoid 138 of the relay R whose ignition interrupting switch 137 controls the ground 143 for the ignition primary winding. Moreover, it has been stated that when pressure is vented in the cylinder 36 of the motor H, the clutch sleeve D usually initially remains engaged with the teeth 16 while the piston 37 begins its return movement under urging of the spring 49, by reason of the engine torque load on the teeth. Hence, the piston 37 will usually initially take up the lost motion movement 51 between itself and the shoulder 52 of the end portion 53 of the rail 38. During this lost motion movement the cammed portion 163 of the piston moves under the ball 166 of the switch T thereby urging the ball 166 upwardly to close the switch T and complete a circuit from battery through the solenoid 138 of the relay R to the ground 93 of the kickdown switch P. Energization of the solenoid 138 causes the switch 137 of the relay R to close thereby completing the circuit between the primary winding 126 of the ignition coil 120 and the ground 143 thereby grounding the ignition system. The engine now missing fire, unloads the torque load on the teeth of the sleeve D thereby permitting the spring 49 to effect disengagement of the sleeve D by moving the piston 37 and rail 38 further rearwardly and complete the rearward or return movement of the sleeve D, piston 37 and rail 38 to the position shown in Figure 2. During this return movement the cammed portion 162 of the piston passes beneath the ball 166 of the switch T permitting the latter to return to its open position restoring the ignition to normal operation. When subsequently the accelerator pedal M is released sufficiently to open the switch P, fourth speed ratio drive may again be restored as previously described provided the vehicle speed is still such that the governor switch N is open.

For the automatic downshift from fourth speed to third speed under control of the vehicle governor O, it is only necessary to reduce the vehicle speed to or below the speed at which the governor switch N normally closes. Closing of the switch N energizes the solenoid L by completing a circuit from the battery 75 to the ground 88. The motor H is then vented and the interrupter switch T operated to effect energization of the solenoid 138 and closing of switch 137 to ground the ignition, all as there described.

When the sleeve F is in its rearward or low range position, the upshift and downshift movement of the sleeve D between first and second speed positions will be the same as that set forth for the operation of this sleeve between third and fourth speed positions when the sleeve F is in its high range setting. However, since the governor O is driven from the countershaft as at 100, 101 in Figure 2, the governor O will function at a somewhat lower car speed depending upon the gear ratios for first and second speed as compared with third and fourth speed as will be readily understood. It will be noted, however, that the governor driving means 101 may, if desired, be on the driven shaft 14.

From the foregoing description of my invention it will be apparent that I have provided a novel ignition interrupter control system and structure for transmissions having both governor and manually controlled downshifting wherein ignition interruption for disengaging engaged clutch elements is obtained as required, and operation of the interrupter means during upshifting operations will not in normal operation of the vehicle cause interruption of the ignition system nor will operation of the interrupter switch during upshifting at any time cause weakening of the spark delivered by the secondary winding of the ignition coil at the spark plugs, at the time of current flow thereto.

It will also be apparent that the invention is applicable to other forms of transmissions. Moreover, although the disclosed embodiment of the invention is well adapted for carrying out the objects hereinabove set forth, it will be understood that various modifications, changes and substitutions coming within the spirit of my invention and within the scope of the appended claims are also contemplated.

I claim:

1. In a power transmission for driving a vehicle having an engine provided with an ignition system having a primary winding; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, means for effecting shift of said shiftable drive control element between its two said positions, electromagnetically operable means for controlling said shift effecting means, ignition interrupting control switch means operable by said shift effecting means when effecting shift of said shiftable drive control element between said first and second positions, ground applying switch means in series electrically with said electromagnetically operable means and with said ignition interrupting control switch means, and a relay for controlling ignition interruption including a solenoid electrically in series with said ignition interrupting control switch means and an ignition interrupting switch controlled by said solenoid and in series electrically with said primary winding for interrupting the ignition system.

2. In a power transmission for driving a vehicle having an engine provided with an ignition system including a primary ignition winding and breaker contacts electrically in series; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, means for effecting shift of said shiftable drive control element between its two said positions, electromagnetically operable means for controlling said shift effecting means, switch means for controlling said electromagnetically operable means and arranged in series electrically therewith, a relay for controlling ignition interruption, said relay including a ground switch operable for applying a ground to said primary ignition winding for interrupting the ignition, and other switch means operable by said shift effecting means for controlling said relay, said other switch means being in series electrically with said relay and said first mentioned switch means.

3. In a power transmission for driving a vehicle having an engine provided with an ignition system including a primary ignition winding and breaker contacts electrically in series; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, means for effecting shift of said shiftable drive control element between its two said positions, electromagnetically operable means for controlling said shift effecting means, speed responsive switch means for controlling said electromagnetically operable means and arranged in series electrically therewith, a relay for controlling ignition interruption, said relay including a ground switch operable for applying a ground to said primary ignition winding for interrupting the ignition, and other switch means operable by said shift effecting means for controlling said relay, said other switch means being in series electrically with said relay and said first mentioned switch means.

4. In a power transmission for driving a vehicle having an engine provided with an ignition system including a primary ignition winding and breaker contacts electrically in series; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, means for effecting shift of said shiftable drive control element between its two said positions, electromagnetically operable means for controlling said shift effecting means, accelerator operable switch means for controlling said electromagnetically operable means and arranged in series electrically therewith, a relay for controlling ignition interruption, said relay including a ground switch operable for applying a ground to said primary ignition winding for interrupting the ignition, and other switch means operable by said shift effecting means for controlling said relay, said other switch means being in series electrically with said relay and said first mentioned switch means.

5. In a power transmission for driving a vehicle having an engine provided with an ignition system including a primary ignition winding and breaker contacts electrically in series; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, means for effecting shift of said shiftable drive control element between its two said positions, electromagnetically operable means for controlling said shift effecting means, speed responsive switch means and driver operable switch means for controlling said electromagnetically operable means and arranged in series electrically therewith and in parallel electrically with each other, a relay for controlling ignition interruption, said relay including a ground switch operable for applying a ground to said primary ignition winding for interrupting the ignition, and other switch means operable by said shift effecting means for controlling said relay, said other switch means being in series electrically with said relay and said first mentioned switch means.

6. In a power transmission for driving a vehicle having an engine provided with an ignition system including a primary ignition winding and breaker contacts electrically in series; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, means for effecting shift of said shiftable drive control element between its two said positions, electromagnetically operable means for controlling said shift effecting means, switch means for controlling said electromagnetically operable means, said switch means having an open and a closed position and operable when closed for energizing said electromagnetic means, a relay for controlling ignition interruption, said relay including a ground switch and a solenoid, said grounding switch being operable when closed for applying a ground to said primary winding for interrupting the ignition, and said relay solenoid being operable when energized for closing said grounding switch, and an interruption controlling switch having an open position and a closed position to which it is operable by said shift effecting means, said switch being electrically in series with said solenoid and said switch means and when closed when said switch means is in closed position being operable for energizing said solenoid.

7. In a power transmission for driving a vehicle having an engine provided with an ignition system including a primary ignition winding and breaker contacts electrically in series; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable drive control element, differential pressure operable motor means including a piston, operable upon said motion transmitting means for effecting shift of said shiftable drive control element between its two said positions by said motion transmitting means, electromagnetically operable means for controlling said shift effecting means, switch means for controlling said electromagnetically operable means and arranged in series electrically therewith, a relay for controlling ignition interruption, said relay including a ground switch operable for applying a ground to said primary ignition winding for interrupting the ignition, and other switch means operable by said piston for controlling said relay, said other switch means being in series electrically with said relay and said first mentioned switch means.

8. In a power transmission for driving a vehicle having an engine provided with an ignition system including a primary ignition winding and breaker contacts electrically in series; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable drive control element, differential pressure operable motor means including a piston, operable upon said motion transmitting means for effecting shift of said shiftable drive control element between its two said positions by said motion transmitting means, electromagnetically operable means for controlling said shift effecting means, switch means for controlling said electromagnetically operable means, said switch means having an open and a closed position and operable when closed for energizing said electromagnetic means, a relay for controlling ignition interruption, said relay including a grounding switch and a solenoid, said grounding switch being operable when closed for applying a ground to said primary winding for interrupting the ignition, and said relay solenoid being operable when energized for closing said grounding switch, and an interruption controlling switch having an open position and a closed position to which it is operable by said piston, said switch being electrically in series with said solenoid and said switch means and when closed when said switch means is in closed position being operable for energizing said solenoid.

9. In a power transmission for driving a vehicle having an engine provided with an ignition system including a primary ignition winding and breaker contacts electrically in series; a shiftable transmission drive control element shiftable from a first position disengaged relative to another drive control element to a second position of engagement with said other element and shiftable out of said second position when operation of said ignition system is momentarily interrupted to relieve the thrust load at said shiftable element, motion transmitting means for shifting said shiftable drive control element, differential pressure operable motor means including a piston, operable upon said motion transmitting means for effecting shift of said shiftable drive control element between its two said positions by said motion transmitting means, a valve for controlling said shift effecting means, a solenoid for controlling said valve, speed responsive and driver operable switch means for controlling said valve solenoid, said switch means having open and closed positions and operable when closed for energizing said valve solenoid, a relay for controlling ignition interruption, said relay including a grounding switch and a solenoid, said grounding switch being operable when closed for applying a ground to said primary winding for interrupting the ignition, and said relay solenoid being operable when energized for closing said grounding switch, and an ignition interrupting control switch means electrically in series with said relay solenoid and said speed responsive and manually operable switch means, said control switch means having an open and a closed position and being momentarily operable by said piston to closed position when effecting shift of said shiftable drive control element between said first and second positions and again between said second and first positions, said control switch means when closed being operable to energize said relay solenoid only when said speed responsive and manually operable switch means is in closed position.

LOUIS B. FORMAN.

REFERENCES CITED

The following references are of record in the file of this patent:

UNITED STATES PATENTS

| Number | Name | Date |
|---|---|---|
| 2,387,891 | Elkin | Oct. 30, 1945 |
| 2,387,911 | Kearney | Oct. 30, 1945 |
| 2,579,693 | Orr | Dec. 25, 1951 |